US008517547B2

(12) United States Patent
Herrmann et al.

(10) Patent No.: US 8,517,547 B2
(45) Date of Patent: Aug. 27, 2013

(54) EXTERIOR REAR VIEW MIRROR WITH FRICTION SPRINGS

(75) Inventors: Andreas Herrmann, Winnenden-Baach (DE); Istvan Szmolenszki, Schwaikheim (DE)

(73) Assignee: SMR Patents S.a.r.l., Luxembourg (LU)

( * ) Notice: Subject to any disclaimer, the term of this patent is extended or adjusted under 35 U.S.C. 154(b) by 177 days.

(21) Appl. No.: 13/150,771

(22) Filed: Jun. 1, 2011

(65) Prior Publication Data

US 2011/0292530 A1 Dec. 1, 2011

(30) Foreign Application Priority Data

Jun. 1, 2010 (EP) .................................... 10164570

(51) Int. Cl.
*G02B 5/08* (2006.01)

(52) U.S. Cl.
USPC .......................................... 359/841; 359/844

(58) Field of Classification Search
USPC .......................................................... 359/844
See application file for complete search history.

(56) References Cited

U.S. PATENT DOCUMENTS

2004/0184171 A1* 9/2004 Flynn ........................... 359/879

FOREIGN PATENT DOCUMENTS

DE 19812734 10/1999
WO 99/00272 1/1999

OTHER PUBLICATIONS

European Search Report for application No. EP 10 16 4570 dated Nov. 5, 2010.

* cited by examiner

*Primary Examiner* — Jade R Chwasz
(74) *Attorney, Agent, or Firm* — Reising Ethington PC

(57) ABSTRACT

The subject is an exterior rear view mirror with at least one base support and a carrier plate holding the mirror glass, adjustably arranged in relation to the base support. At least one friction bearing is provided between the carrier plate and the base support, which includes at least one friction spring arranged on the carrier plate, projecting in the direction of the base support, with at least one first guide support and at least one second guide support assigned to the base support. The first and second guide surfaces come into contact with each other. A slot, arranged on the base support, assigned to the friction spring, comprises a receiving opening, into which the friction spring is inserted. The receiving opening is bordered by at least one wall, which forms at least a second guide surface of the friction bearing.

9 Claims, 4 Drawing Sheets

EXTERIOR REAR VIEW MIRROR WITH FRICTION SPRINGS

The invention is based on a priority patent application EP 10164570.3 which is hereby incorporated by reference.

BACKGROUND ART

1. Field of the Invention

The invention relates to a fault detection arrangement for electric consumers in motor vehicles. More particularly, the invention relates to a fault detection arrangement to detect the function and/or malfunction of an electric consumer in a motor vehicle.

2. Description of the Related Art

The invention relates to an exterior rear view mirror with an adjustable mirror glass, which comprises at least one friction spring.

An exterior rear view mirror design for a motor vehicle consists, for example, of a mirror foot arranged on the motor vehicle, which can be covered by a mirror foot cover, and an exterior rear view mirror arranged on the mirror foot. The mirror foot can be produced as a die-cast piece, for example, from a material which is resistant to forces and moments. The exterior rear view mirror comprises an exterior rear view mirror housing, which, among others, accommodates a base support assigned to the mirror foot.

The mirror foot and the base support are hinged together, so that the exterior rear view mirror can be pivoted about a hinge axis towards the mirror foot from an operating position to a folding point and vice versa. In this process, bearing means can be provided between the mirror foot and the base support, in order to keep wear and tear and frictional forces arising during movement as low as possible.

Preferably, the base support is also produced as a die-cast part from a material resistant to arising forces and moments, for example, from the same material as the mirror foot. An adjusting device for a mirror glass, driven by an electric motor, for example, is arranged on the mirror foot. The adjusting device acts on a carrier plate, on which the mirror glass is arranged. The mirror glass can be mounted onto the carrier plate by means of an adhesive connection, for example. The carrier plate can be guided to and/or mounted on the adjustment device and/or the base plate.

On its rear side, facing away from the direction of movement of the motor vehicle in the operating position, the exterior rear view mirror housing comprises an opening, through which the mirror glass is visible, or in which the mirror glass is arranged. In order to ensure that the mirror glass is adjustable, a distance is kept on all sides between the mirror glass or carrier plate and the walls of the exterior rear view mirror housing surrounding the opening, so that a gap is given around the mirror glass between the walls of the exterior rear view mirror housing surrounding the opening.

In addition, the exterior rear view mirror can comprise a repeated flashing light, a module for a driving assistance device, such as blind spot monitoring, a lane departure warning, approach monitoring, or similar, or a combination thereof Alternatively or additionally, the exterior rear view mirror can also comprise sensors for recording driving and/or surrounding conditions, such as for example, temperature, brightness, degree of pollution, lighting situation, for example, in order to automatically heat the mirror glass, or to dim electro-chromatically, for example.

In order to avoid or at least partly suppress unwanted movements of the mirror glass, such as unwanted shaking during movement of the motor vehicle, it is known to provide a fixture device acting between the carrier plate holding the mirror glass and the base plate, for example, throughout the adjusting device, through this or reaching to this. The fixture device holds the carrier plate, together with the mirror glass arranged on it, in a desired adjustment position in relation to the base support, individually adjustable by the driver of the vehicle, without essentially limiting the adjustability of the carrier plate together with the mirror glass arranged on it in relation to the base support. The fixture device can be designed as a friction bearing, for example. A friction bearing of this type consists of guide surfaces, which are moveable at least in pairs relative to each other, and which come into contact with each other. In this way, for each pair of guide surfaces, a first guide surface is arranged on a first component, of the components to be clamped to each other in each adjustment position, and a second guide surface coming into contact with the first guide surface is arranged on the other component. The clamping is done by friction forces between the at least two guide surfaces in contact with each other.

An exterior rear view mirror is known in WO 99/00272, in which a friction bearing is arranged between the base support and a carrier plate holding the mirror glass for the prevention of unwanted movements of the mirror glass. In this process, a first guide surface of the friction bearing is assigned to the carrier plate and a second guide surface in contact with the first guide surface is assigned to the base support. The first guide surface is formed by a raised part, for example a reinforcing rib, on a curved nib on the carrier plate, projecting in the direction of the base support. The second guide surface has a concave form, seen from the raised part of the curved nib and from a bearing position, about which the mirror glass can be pivoted for adjustment, and is formed on an arm extension protruding to the base support in the direction of the carrier plate.

A generally known and as yet unsolved problem of exterior rear view mirrors of this type is a complicated assembly of the fixture device acting between the carrier plate holding the mirror glass and the base support, connected with a high tolerance of clamping between the carrier plate and the base support.

SUMMARY OF THE INVENTION

An object of the invention is to make an exterior rear view mirror available, which is easy to assemble, with a lower tolerance of clamping between the carrier plate holding the mirror glass, and the base support.

The object is achieved by the characteristic that the guide for the friction springs is formed in a specific way.

Thus, an exterior rear view mirror with a base support and a carrier plate holding the mirror glass arranged thereon in an adjustable manner is provided, in which, in order to hold the mirror glass in an adjusted position, at least one friction bearing is arranged for preventing unwanted movements between the carrier plate and the base support. On the carrier plate, protruding in the direction of the base support, the at least one friction bearing includes at least one friction spring, which preferably has a spring elastic manner, and particularly preferably, is rigid. The friction spring can be produced integrally with the carrier plate, for example, by injection moulding from the same material as the carrier plate, or for example by 2 shot or multi-component injection moulding, or by overmoulding, for example, of a friction spring made of a material different from that of the carrier plate, with the carrier plate material. It is also possible for friction springs and carrier plates to be produced as separate components, and subsequently firmly or positively connected to each other, or positively and by means of friction. In the case of an attachment of the friction spring to the carrier plate including at least one positive connection, the friction spring is produced from a metallic material, for example.

The friction spring comprises at least a first guide surface, which comes into contact with at least a second guide surface assigned to the base support, for the purpose of clamping together the carrier plate holding the mirror glass and the base support.

At least a second guide surface is situated in at least one slot assigned to at least one friction spring situated in the base support. The slot has a receiving opening for the friction spring. The receiving opening is bordered by at least one wall, which forms a second guide surface of the friction bearing.

The slot preferably comprises a structure, with a convergent-divergent cross-sectional profile, tapering towards the centre of the receiving opening. Due to the tapering structure with a convergent-divergent cross-sectional profile, at least two walls, which are opposite-facing and border the receiving opening, face each other in a convex form. At least one part of these walls forms at least a second guide surface.

In this way, parts of both opposite-facing walls together form at least a second guide surface. It can be both a part of each wall for itself, as well as parts of all walls together, which form the at least one second guide surface.

If, for example, parts of both walls which are opposite-facing and convexly facing each other together form at least a second guide surface, in this case two first guide surfaces are provided on surfaces of the friction spring, which are facing away from each other. Therefore the friction spring with both surfaces can be in preferably simultaneous contact with both opposite-facing walls.

On one hand, a constant, uniform contact of the friction spring with at least one of the walls is ensured by the opposite-facing walls, whereby, in comparison with the prior art, in which the friction spring fits on only one side on only one corresponding, opposite-facing guide surface with a variable contact pressure up to freedom of contact, a minimum clamping is ensured, or which uniform contact bounds the clamping at the bottom, and on the other hand, a line contact between the friction spring and walls is ensured due to the convex form of the walls, whereby a maximum clamping is ensured, or of which line contact, in comparison to a guide contact existing in the prior art, bounds the clamping at the top.

There are apparent advantages of the invention in comparison with the prior art, among others, that a lower tolerance of the friction forces generating the clamping between the first and second guide surfaces of the friction bearing is ensured, and on the other hand, an ease of manufacture and assembly connected to the lower costs in series production of exterior rear view mirrors can be ensured, due to the simple structure and the easy construction of the friction bearing.

Further advantages in comparison with the prior art are apparent, for example, that the assembly of the friction bearing consisting of the friction spring and slot is simplified by the convergent-divergent cross-sectional profile of the receiving opening, into which the friction spring is inserted, for example, due to the self-centering effect of the structure tapering towards the middle of the receiving opening.

The friction spring can be arranged in various ways on the carrier plate. So, for example, a friction spring produced from a metallic material can be overmoulded by the carrier plate material. An integral arrangement of carrier plate and friction spring is also possible. For this purpose, the friction spring can be an integral component of the carrier plate. The production of a carrier plate provided integrally with a friction spring can take place in an injection moulding process. Carrier plates and friction springs can also be designed in two or several pieces. For example, a plug-in fastening of the friction spring can be provided in the carrier plate. For this purpose, a part of the friction spring forming a base, an angled part, for example, can be accepted into an insert pocket provided in the carrier plate. The base can be inserted into the insert pocket in a direction of an insertion, with this direction of insertion running preferably transversely, e.g. perpendicularly, to the direction of movement of the friction spring in the slot, as well as transversely, e.g. perpendicularly to the level formed by the carrier plate or the mirror glass. It is important to note that the named design possibilities of the friction spring on the carrier plate are not limited to one friction spring, but can also be provided for several friction springs arranged on the carrier plate.

The friction spring preferably has a curved course.

A remaining gap preferably has a straight course in the most recent position between the opposite-facing, preferably convex walls bordering the receiving opening. The friction spring is inserted into the gap between the walls during assembly. The straight course is cost-effective to produce and satisfies the degrees of freedom of pivoting about two axes running parallel to the mirror glass, which is required for the adjustment of the mirror glass. Either the immersion depth of the friction spring in the receiving opening and/or the immersion angle of the friction spring in the receiving opening changes during pivoting about an axis running parallel to the mirror glass. However, the immersion position does not change, or at least does not change considerably, as this would be the case during pivoting about an axis running normally to the mirror glass. Therefore, without limiting adjustability, the gap can comprise a straight course due to pivoting about two axes running parallel to the mirror glass.

The walls of the receiving opening bordering the length of the gap can be designed simply and free from curvature, in contrast to the convex walls bordering the width of the gap according to the previously described preferred embodiment. A plane design of the walls bordering the length of the gap has no disadvantage on either the assembly or the function.

For further simplification of assembly, the plane walls of the receiving opening bordering the length of the gap can be so arranged, for example, that viewed from the mirror glass, a convergent shortening of the length of the gap arises with increasing depth of the receiving opening. In this way these walls bordering the length of the gap provide self-centering for the friction spring during assembly.

According to an advantageous embodiment of the invention, the slot and the base support are integral. The base support with integral slot can be produced in an injection moulding process, for example. It is particularly advantageous when a two-component injection moulding process is applied, whereby the slot and base support can be integral, but produced from different materials.

According to another preferred embodiment of the invention, the slot is produced as a part which is separate from the base support. With the slot being designed as a component which is separate from the base support, for example, produced as an injection moulding part, the production costs can be further reduced. Amongst others, a reduction of the production costs is facilitated, since the accuracy of the form of the slot, which considerably influences the tolerance of the clamping, must not be produced considerably higher, which would be more difficult, with a base support to be made with a tolerance which is as low as possible.

In order to simplify the assembly, it can be intended to snap the slot into the base support. For this purpose, a snap connection between the base support and slot is provided.

Particularly preferably, the slot is produced from an elastomeric material, or the material of the slot includes an elastomeric material.

According to the adjustment direction of the mirror glass, a friction spring and a slot assigned to this can be provided.

In principle, the friction bearing can also be built the other way round, whereby the friction spring is arranged on the base support, and the slot assigned to the friction spring is arranged on the carrier plate holding the mirror glass.

It is important to note that the arrangement possibilities described in each case do not only refer to a friction bearing consisting of a friction spring and a slot, but rather can include several friction springs and slots, which can all be designed identically, or also designed differently, for example, according to the different arrangement possibilities described above.

Further features of the invention will be apparent from the further claims, description and drawings.

BRIEF DESCRIPTION OF THE DRAWINGS

Embodiments of the invention are explained in more detail in the drawings. Identical reference characters denote identical or identically working elements. In the schematic representation.

DETAILED DESCRIPTION OF THE DRAWINGS

Figure 1:
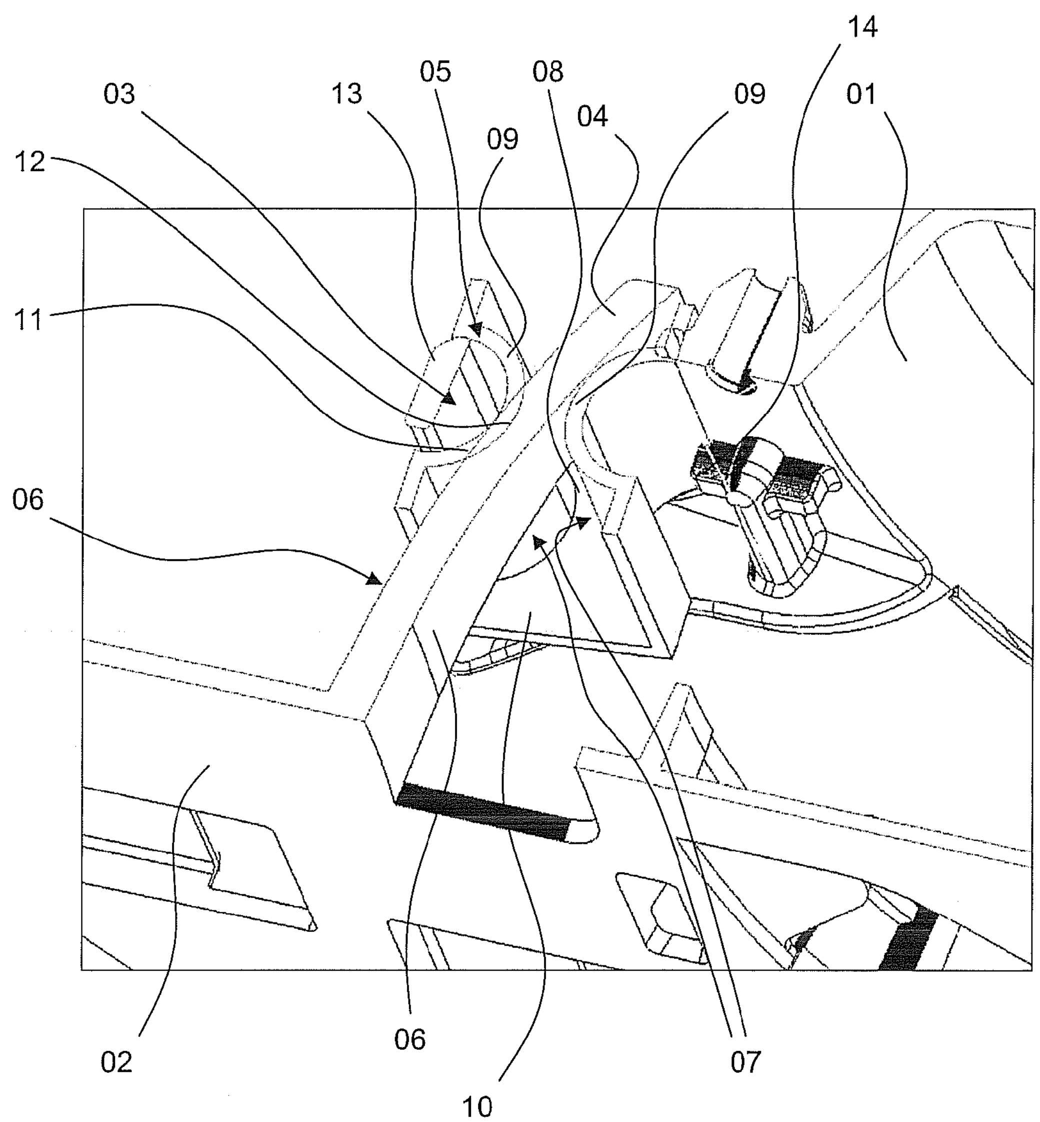
FIG. 1 shows a friction bearing working between the base support and carrier plate of an exterior rear view mirror, from a perspective view.
Figure 2:
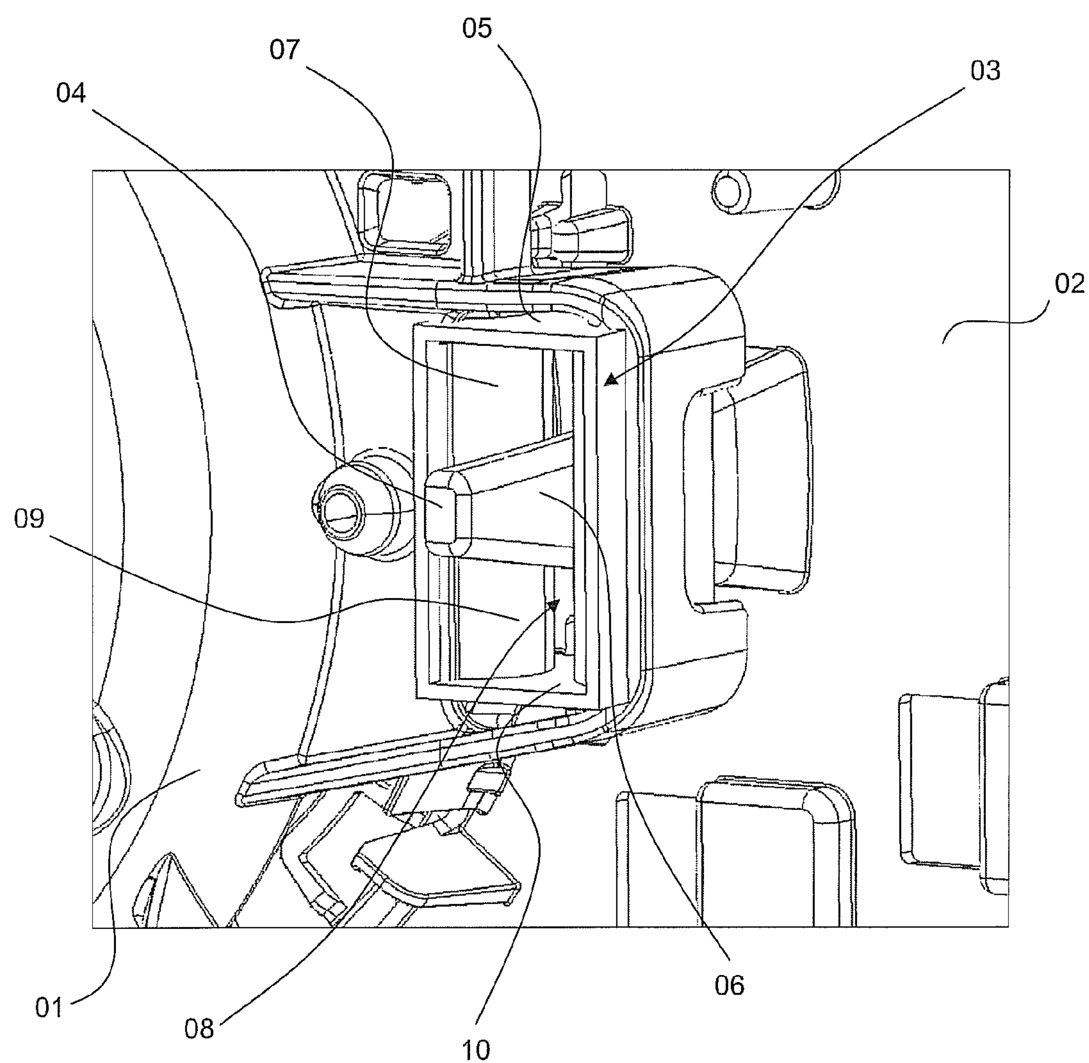
FIG. 2 shows the friction bearing from FIG. 1 seen from the base support, in a perspective view.

An exterior rear view mirror for a motor vehicle includes, for example, an exterior rear view mirror housing, which accommodates at least one base support 01 assigned to a mirror foot arranged on the motor vehicle. A carrier plate 02 holding a mirror glass is adjustably arranged in relation to the base support 01. At least one friction bearing 03, shown in FIGS. 1 to 4 wholly or in parts, is provided between the carrier plate 02 and the base support 01, in order to avoid unwanted movements of the mirror glass whilst the motor vehicle is in motion.

The friction bearing 03 comprises a friction spring 04, arranged on the carrier plate 02, protruding from the carrier plate 02 in the direction of the base support 01, as well as a slot 05 assigned to the friction spring 04 or provided in the base support 01. Preferably, at least one first guide surface 06 is provided on two surfaces of the friction spring 04 turned away from each other. The slot 05 comprises at least a second guide surface 07, which comes into contact with one of the first guide surfaces 06.

The friction bearing 03 clamps the carrier plate 02 together with the mirror glass arranged thereon in a desired adjustment position, individually adjustable by the driver of the motor vehicle, in relation to the base support 01, without essentially limiting the adjustability of the carrier plate 02 together with the mirror glass arranged thereon in relation to the base support 01. Friction occurs between the guide surfaces 06, 07 due to the first and second guide surfaces 06, 07 coming into contact or lying next to each other. The frictional force resulting from this serves to clamp the carrier plate 02 holding the mirror glass in relation to the base support 01 in any preset adjustment position of the mirror glass. The clamping prevents unwanted movements of the mirror glass in relation to the base support 01.

The slot 05 has a receiving opening 08, into which the friction spring 03 is inserted. The receiving opening 08 is bordered widthways by opposite-facing walls 09, and lengthways by walls 10. At least parts of the opposite-facing walls 09 form the at least one second guide surface 07 of the friction bearing 03. The friction spring 03 can be moved against the friction force in the receiving opening 08.

The slot 05 preferably has a structure with a convergent-divergent cross-sectional profile of the receiving opening 08 tapering towards the middle of the receiving opening 08. The two opposite-facing walls 09 which border the width of the receiving opening 08 preferably face each other in a convex form. In the most recent position of the receiving opening 08, a gap remains between the opposite-facing, convex walls 09.

The remaining gap forming the receiving opening 08 between the opposite facing, convex walls 09, which border the receiving opening 08 widthways, preferably has a straight course. The friction spring 04 is inserted between the walls 09 into the gap.

The walls 10 of the receiving opening 08 bordering the length of the gap can be designed simply and free from curvature as shown in FIGS. 1, 2, 3 and 4.

The friction spring 04 comprises a curved course, for example, and is preferably spring-elastic, and particularly preferably, has a rigid design. The effect obtainable from this can be seen in FIG. 1. Here the curve 11 illustrates the curved course of a friction spring 04 in an unloaded state, and the curve 12 illustrates the one-sided curve of the cross-sectional profile of the receiving opening 08 given by the convex walls 09. The friction spring 03 received in the receiving opening 08 can be elastically deformed by a rigid, spring-elastic embodiment of the friction spring 03, so that at least a first guide surface 06 of the friction spring 03 is in contact with at least one of the walls 09 bordering the receiving opening 08 of the slot 05.

Due to the convex walls 09 and the convergent-divergent cross-sectional profile, the friction spring 04 is in constant line contact with at least one of the walls 09. In other words, at least one part of both opposite facing walls 09, which face each other convexly, forms at least one second guide surface 07 in contact with at least one first guide surface 06 of the friction spring 04.

The friction spring 04 of the friction bearing 03 shown in FIG. 1 is integrally connected to the carrier plate 02 by injection moulding, for example. The friction spring 04 can comprise, for example, a core of any material, which, for example, is held in an injection mould during the injection moulding, and is subsequently overmoulded with the material of the carrier plate 02. The friction spring 04 can also be designed as an integral component of the carrier plate 02, and can consist entirely of the same material as the carrier plate 02.

It is also possible to injection mould the friction spring 04 made from a material different to that of the carrier plate 02, in 2 shot-or multi-component injection moulding.

The friction spring 04 and carrier plate 02 can be produced as separate components and subsequently firmly or positively connected to each other, or positively and by means of friction. For example, a plug-in fastening of the friction spring 04 in the carrier plate 02 is provided, with a part of the friction spring 04 forming a base being received into an insert pocket provided in the carrier plate 02. The direction of insertion of the base into the insert pocket is preferably transverse, if necessary, perpendicular to the direction of movement of the friction spring 04 in the slot 05. In this way, the direction of movement runs perpendicularly to the level formed by the carrier plate 02 or the mirror glass attached to the carrier plate 02 by means of an adhesive connection, for example.

Figure 3:
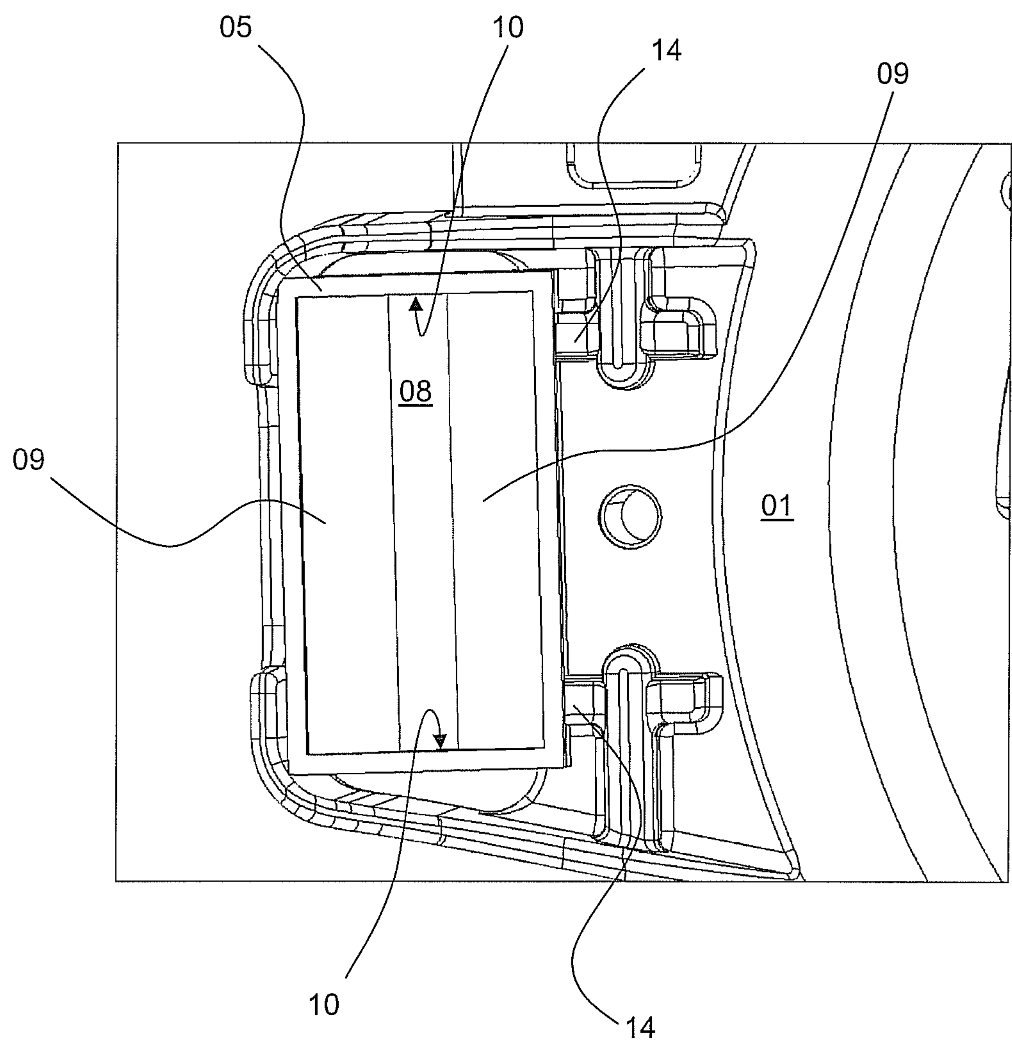
FIG. 3 a slot of the friction bearing from FIG. 1 arranged on the base support, in a frontal view seen from the carrier plate.
Figure 4:
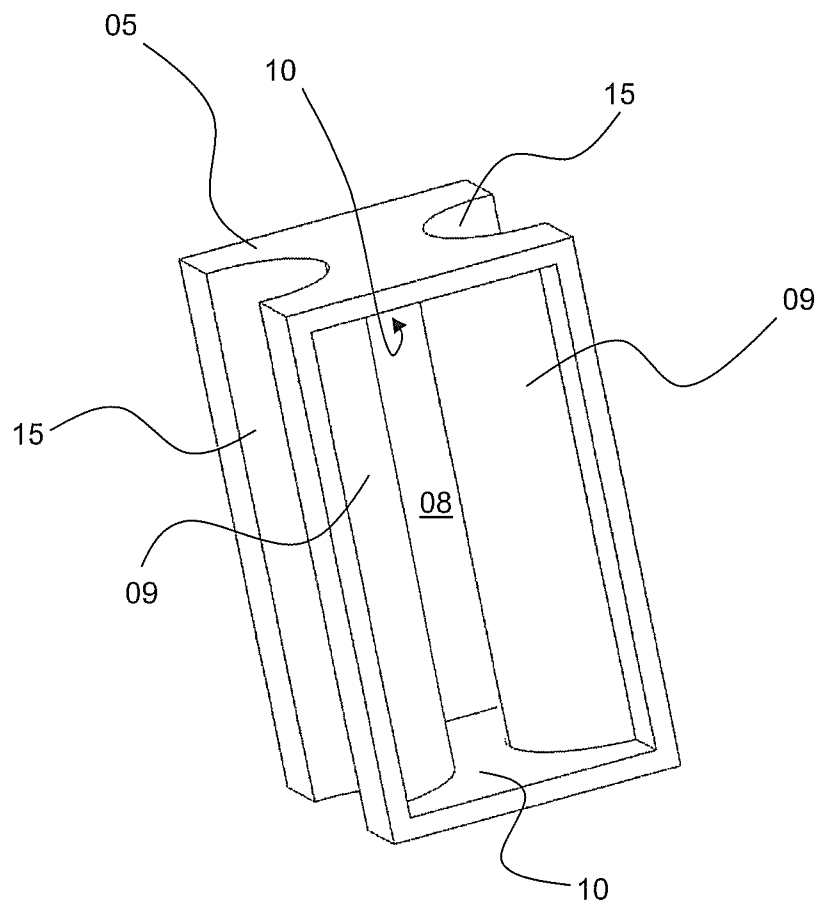
FIG. 4 the slot from FIG. 3, from a perspective view.

The slot 05 and the base support 01 can be produced as separate parts, as can be seen in FIGS. 3 and 4. A snap connection can be provided between the slot 05 and the base support 01 for easy mounting of the slot to the base support. The snap connection can be formed by a bar 13 provided on the base support 01, as well as protrusions 14, which correspond to the concave exterior sides 15 of the walls 09 of the slot 05. The guiding or mounting of the slot 05 in the remaining directions can be ensured for example by an insertion opening designed as a clearance in the base support 01.

Of course, it is also possible for the slot 05 and base support 01 to be produced integrally. The integral production can take place in a way similar to the previously described production possibilities for the friction springs in an injection moulding process, for example, from a homogenous material, or for example, in 2-shot or multi-component injection moulding of different materials.

It is important to note that the invention is not exhausted by an exterior rear view mirror, but rather includes both exterior rear view mirror designs for vehicles, particularly motor vehicles, with an exterior rear view mirror described previously or in the claims, as well as friction bearings for exterior rear view mirrors of motor vehicles.

Thus, the invention also concerns a fixture device designed as a friction bearing in order to prevent unwanted movements between a carrier plate holding a mirror glass of an exterior rear view mirror and a base support of the exterior rear view mirror.

The invention can be applied industrially in the field of production of exterior rear view mirrors and exterior rear view mirror configurations for motor vehicles.

List of Reference Numerals

01 base support
02 carrier plate
03 friction bearing
04 friction spring
05 slot
06 first guide surface
07 second guide surface
08 receiving opening
09 wall
10 wall
11 curve
12 curve
13 bar
14 protrusion
15 exterior side

We claim:

1. An exterior rear view mirror assembly comprising:

a base support and a carrier plate holding a mirror being adjustably arranged in relation thereto;

a friction bearing having a friction spring arranged on said carrier plate between said carrier plate and said base support projecting in the direction of said base support; and a first guide support and a second guide support assigned to said base support, whereby said first and second guide surfaces come into contact with each other, wherein, a slot, arranged on said base support, assigned to said friction spring, having a receiving opening into which said friction spring is inserted, whereby said receiving opening is bordered by at least one wall, which forms said second guide surface of said base support, wherein said slot includes a structure with a convergent-divergent cross-sectional profile tapering to a center of said receiving opening, whereby at least two opposite-facing walls, which border said receiving opening, face each other in a convex form.

2. An exterior rear view mirror assembly according to claim 1, wherein at least one section of both of said opposite-facing walls, which face each other in a convex form, forms said second guide surface.

3. An exterior rear view mirror assembly according to claim 2, wherein said friction spring includes said first and second guide surfaces, which face away from each other, with the first guide surface coming into contact with said second guide surface, formed with a convex form facing each other, by sections of the different opposite-facing walls.

4. An exterior rear view mirror assembly according to claim 1, including opposite-facing walls defining a straight course of a gap therebetween bordering the width of the receiving opening, whereby said friction spring is inserted between said opposite-facing walls.

5. An exterior rear view mirror assembly according to claim 1, including opposite-facing walls wherein said opposite-facing walls are level and non-curved, which border the length of said receiving opening.

6. An exterior rear view mirror assembly according to claim 1, including opposite-facing walls bordering the length of said receiving opening that converge toward each other, as viewed from said carrier plate holding said mirror.

7. An exterior rear view mirror assembly according to claims 1, wherein said slot and said base support are integrally produced.

8. An exterior rear view mirror assembly according to claim 1, wherein said slot and said base support are produced as separate parts.

9. An exterior rear view mirror assembly according to claim 1, wherein said friction spring extends through a curved path.

* * * * *